Oct. 13, 1936.                P. G. WILLETTS                2,057,466
        METHOD OF AND APPARATUS FOR MOLDING REFRACTORY BLOCKS AND THE LIKE
                     Filed June 16, 1934           3 Sheets-Sheet 1
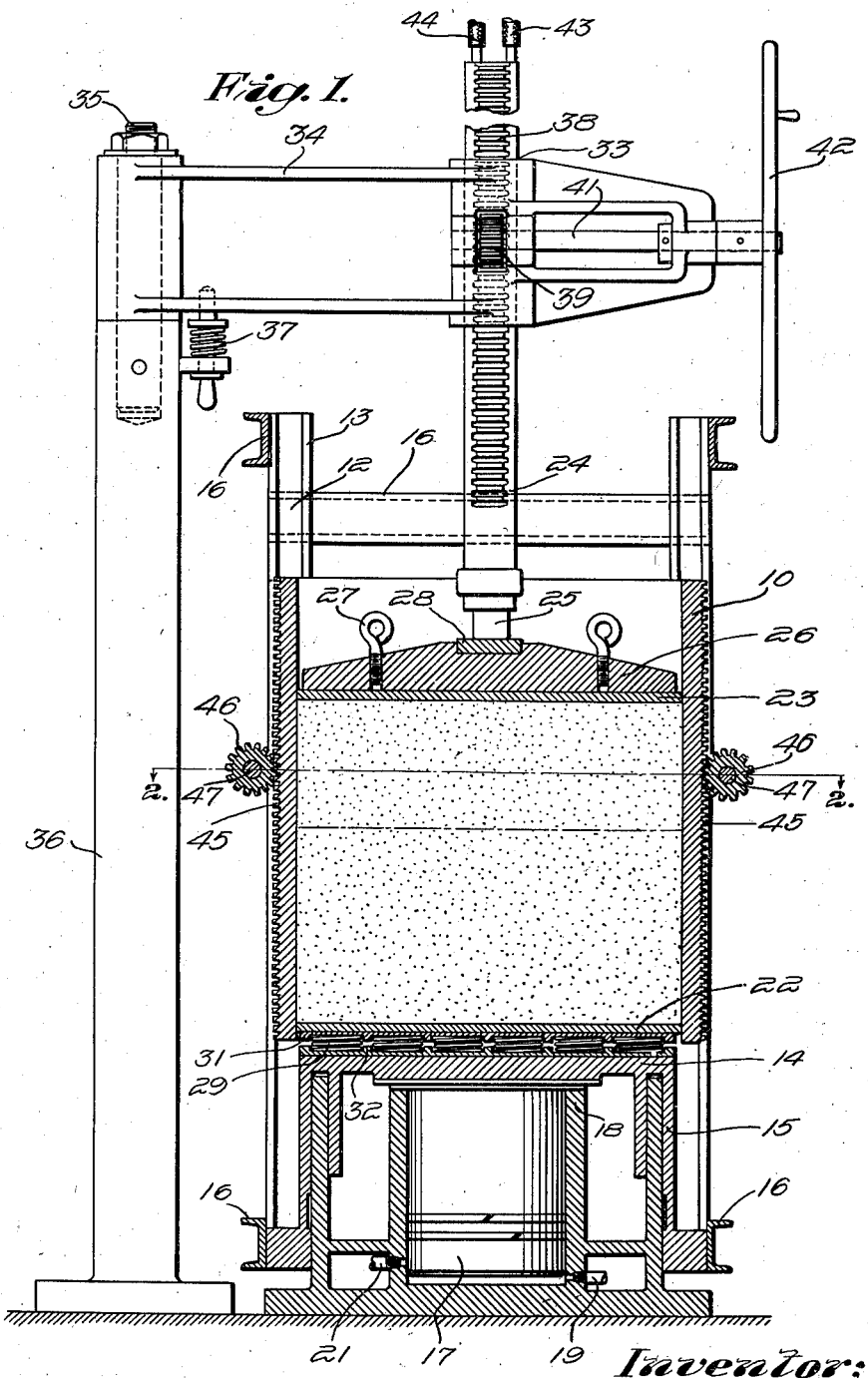
Witness:
W. B. Thayer
Inventor;
Paul G. Willetts
by Brown Parham
Attorneys Oct. 13, 1936.　　　P. G. WILLETTS　　　2,057,466
METHOD OF AND APPARATUS FOR MOLDING REFRACTORY BLOCKS AND THE LIKE
Filed June 16, 1934　　　3 Sheets-Sheet 2
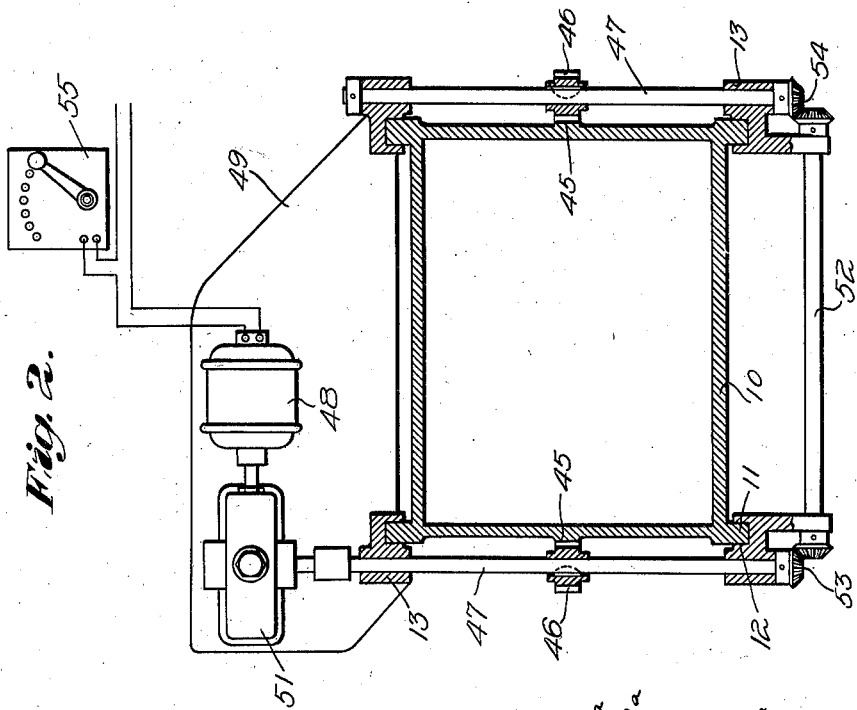
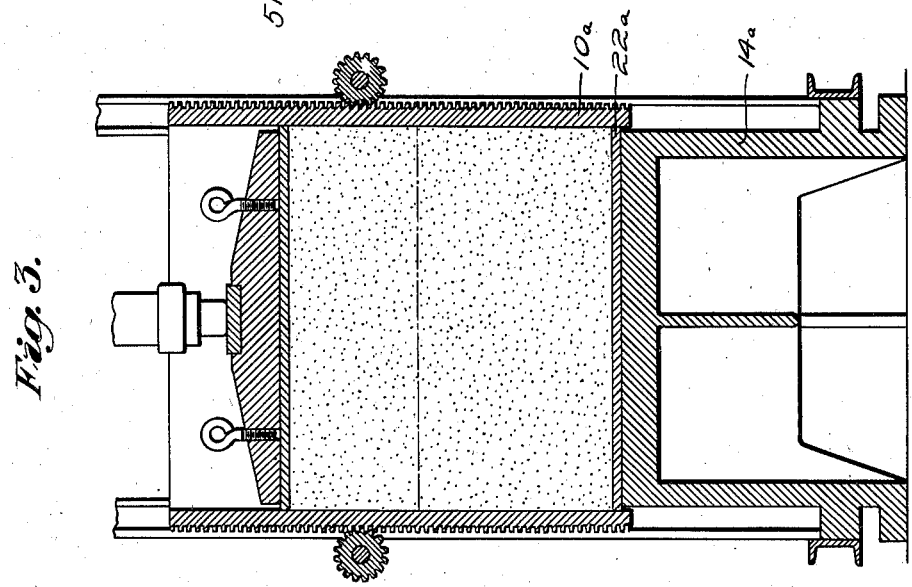
Witness:
W. B. Thayer.
Inventor:
Paul G. Willetts
by Brown Parham
Attorneys Oct. 13, 1936.  P. G. WILLETTS  2,057,466
METHOD OF AND APPARATUS FOR MOLDING REFRACTORY BLOCKS AND THE LIKE
Filed June 16, 1934   3 Sheets-Sheet 3
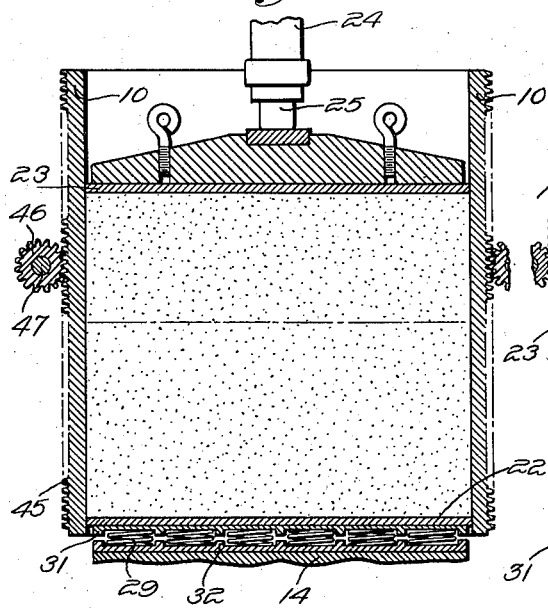
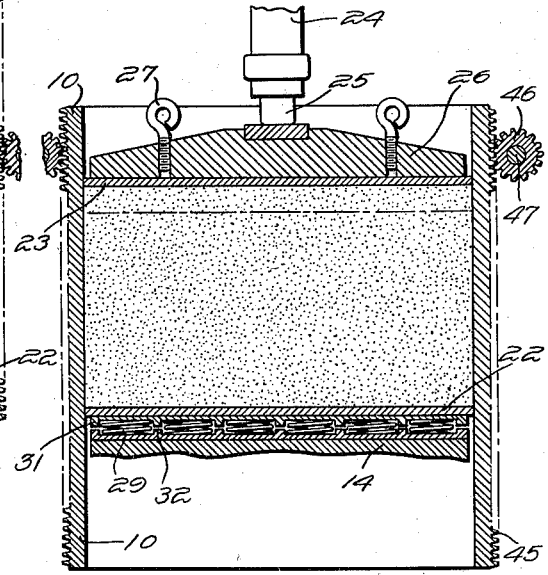
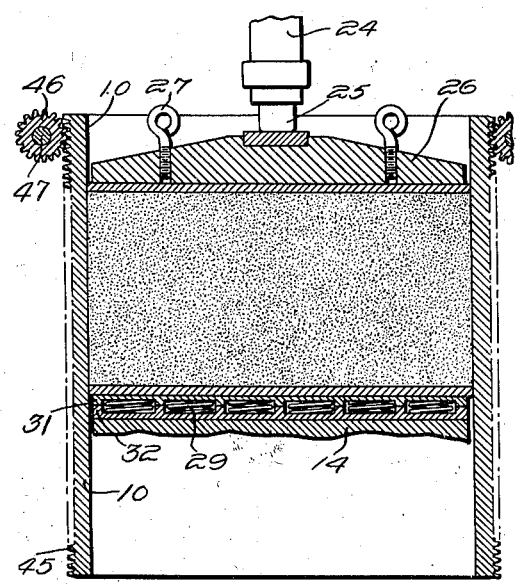
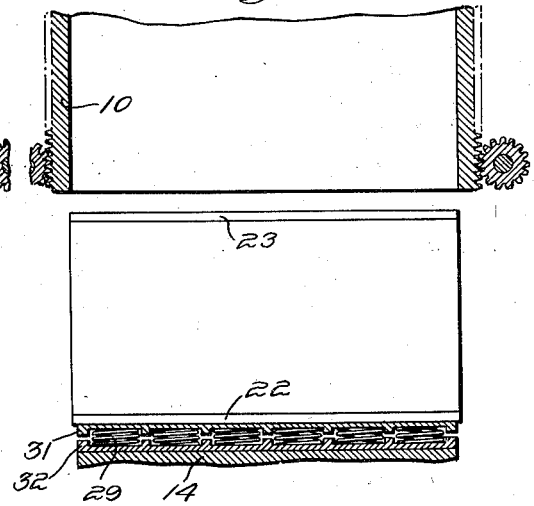
Inventor:
Paul G. Willetts
by Brown & Parham
Attorneys
Witness:
W. B. Thayer.

Patented Oct. 13, 1936

2,057,466

UNITED STATES PATENT OFFICE 2,057,466

METHOD OF AND APPARATUS FOR MOLD-ING REFRACTORY BLOCKS AND THE LIKE

Paul G. Willetts, West Hartford, Conn., assignor to Hartford-Empire Company, Hartford, Conn., a corporation of Delaware Application June 16, 1934, Serial No. 730,958

24 Claims. (Cl. 25—45)

This invention relates to methods of and apparatus for molding refractory blocks and the like, and has particular relation to the molding of relatively large and thick blocks, such as refractory tank blocks for glass furnaces.

It has been proposed, for example, to mold refractory blocks of the above character by introducing the material for a block into a five-sided mold, placing the mold upon a shaking or vibrating table and subjecting the material to impacts from above by means of an air hammer or the like acting on a cover loosely fitting within the mold, while the mold and its contents are vibrated by the table.

It has been found, however, that such a method is not wholly satisfactory for the reason that blocks made thereby vary in density and/or are not as dense as is desired. For example, a block made by such a method tends to vary in density from top to bottom, the top portion tending to be of high density and lower portions of decidedly lower density, while a layer of material of high density is apt to be formed on the bottom of the block.

Such defects are objectionable especially in tank blocks for glass furnaces, it being important that such blocks not only be of high density and low porosity but also of uniform density and uniform porosity, in order that they will wear away uniformly and smoothly in contact with molten glass.

The general object of the present invention is to provide a novel method of and novel apparatus for molding refractory blocks and the like of high and uniform density and of low and uniformly distributed porosity.

Another object of the present invention is to overcome, or at least minimize, the disadvantages in the vibration or shaking process described above by so operating the mold in which the block is formed as to release air from the interior of the material during vibration thereof and to permit it to escape from the mold. I have discovered that this permits the material to be compacted uniformly into a block of uniform density and porosity and of very high density and low porosity. This is accomplished by effecting a relative movement between the side walls of the mold and the material being molded therein during vibration, the resultant scouring action of the mold walls on the material apparently setting up numerous fine channels through which air may escape from the interior of the material. Such relative movement is made possible by employing what is in effect a four-sided mold, that is, one in which there is relative movement between the rigidly connected side walls and both the top and bottom of the mold. By affording the escape of air in this way, a block of maximum density may be produced free of laminations and of uniform density.

A more specific object of the invention is to provide a novel method and novel apparatus for molding blocks by the vibration or shaking process, wherein the side walls of the mold are reciprocated relative to the material for a block, during the vibration and compacting of the material in the mold. Preferably the sides of the mold are moved or driven positively during the compacting operation. It also is preferred to move the side walls a greater distance than that through which the material is compressed in forming a block to assure the maximum release of air from the material being molded.

Other objects and advantages of the invention will be pointed out in the following description, or will become apparent therefrom.

In order that the invention may be more readily understood, reference may be had to the accompanying drawings, in which I have illustrated a preferred embodiment of my novel apparatus which may conveniently be used for carrying out my novel method. In the drawings, Figure 1 is a view in vertical sectional elevation of the apparatus;

Fig. 2 is a view in horizontal sectional top plan taken on the line 2—2 of Fig. 1;

Fig. 3 is a fragmentary view of a modification of the apparatus shown in Figs. 1 and 2; and Figs. 4 to 7 inclusive are partial views of the apparatus shown in Fig. 1, showing various stages in the operation of said apparatus in the performance of the novel method.

Referring now in detail to the drawings, Fig. 1 shows a mold consisting of the four side walls 10 connected integrally or rigidly and having guides 11 formed at the corners thereof, as shown in Fig. 2, which guides are received in guideways 12 of vertical frame members 13. The frame members 13 arise from the vibrating or shaking table 14 having a skirt 15 to which said vertical frame members are attached. The frame members are braced by means of horizontal channel irons 16 connected to the bottom and upper ends thereof, as shown in Fig. 1. Table or carrier 14 has a piston 17 connected to the bottom thereof located in cylinder 18 having in it exhaust pipes 19 and 21 for the admission and exhaust of air pressure to effect the vibration of the table in known manner. It will be understood that the table 14 may be shaken by means other than that shown in the drawings.

The bottom of the mold is formed by a plate 22 which fits snugly within the side walls, but with a sufficient clearance to permit the escape of air between the edges of the plate and the side walls. Preferably such clearance is approximately a five-thousandth of an inch, it having been found that with such a clearance air may escape without, however, permitting the passage of material between the edges of the plate and the side walls, such as would close off the clearance and prevent the escape of air. The top of the mold is formed by a plate 23 having the same or similar clearance with the side walls as the bottom plate 22. This not only affords escape of air but at the same time permits the uniform application of pressure to the entire area of material in the mold which is not possible with a loosely fitting cover. Such clearance also prevents fins forming on the block.

In order to apply rapid vibratory blows or impacts to material to be compacted in the mold during shaking or vibration thereof, an air hammer 24 is provided, the head 25 of which is adapted to act upon an anvil or heavy plate 26 which rests on the top plate 23 of the mold. This plate 26 has rings 27 by which it is handled and at its center is provided with a hard rubber or gutta-percha insert 28 which receives the blows from the hammer 24 and increases the vibrations of the air hammer upon the material being molded by reverberation.

To the same end the bottom plate 22 may, if desired, be mounted upon springs 29 contained between spring plates 31, one of which rests on table 14 and the other of which carries the bottom plate 22 of the mold. The spring plates may be provided with stops 32 to positively limit the movement of the bottom plate 22 toward the table 14 to insure the formation of a block of the desired thickness. If desired, these stops may be made adjustable although in the drawings they have been shown to be integral with the spring plates.

The hammer 24 may be mounted in a vertical guideway 33 formed in the outer end of an arm or carrier 34 which is pivoted at 35 on a rigid and stationary column 36. This arrangement permits the hammer to be swung from a position centrally of the mold to one side of the mold, so that the material to be molded can be introduced into the mold. To hold the hammer in registry with the center of the anvil 26, a spring pressed pin 37 may be provided, this pin being attached to column 36 and adapted to enter a hole in the underside of the arm 34 which carries the hammer, thus locking the arm and hammer in operative position. When it is desired to release the hammer for swinging movement, the pin is simply drawn downwardly.

To move the hammer downwardly following the descent of the heavy plate or anvil 26 and to thereafter withdraw the hammer, a rack is provided on the hammer, as indicated at 38, this rack being engaged by a pinion 39 on a shaft 41 horizontally journaled in the arm 34 and carrying a hand wheel 42 by means of which the hammer is bodily reciprocated.

The air hammer may be of the usual construction, air inlet and outlet pipes 43 and 44 being provided for the admission and exhaust of air to operate the hammer in the usual way.

As above stated, the side walls of the mold are slidably mounted in the vertical frame members 13. Such mounting of the side walls is for the purpose of allowing them to be moved downward or vertically reciprocated as a unit during the compacting of the material in the mold and also to permit them to be raised as a unit to strip the mold from the finished block. The arm 34 which supports the air hammer is supported at a sufficient height above table 14 to permit the side walls 10 to be stripped from a finished block without striking the arm.

As a convenient means for effecting such reciprocation, the opposite side walls may be provided with vertical racks 45 located centrally thereof with which mesh pinion gears 46 on the horizontal shafts 47. One of the shafts 47 may be driven from a motor 48 carried on a platform 49 connected at one side of the mold to vertical frame members 13. The motor 48 may drive the shaft 47 through suitable reducing gears indicated at 51. The shaft 47 thus driven in turn drives the other shaft 47 through a third shaft 52, bevel gears being provided on the shafts as indicated at 53 and 54 for this purpose. Other means may be employed for effecting the movement of side walls 10 as a unit, if desired.

By the provision of a suitable rheostat indicated at 55, the speed of movement of the side walls of the mold may be varied as desired.

Instead of employing a vibrating table for carrying the mold, the construction of Figs. 1 and 2 may be modified, as shown in Fig. 3, to provide a stationary table 14a, upon which the bottom plate 22a of the mold may rest directly, as shown in Fig. 3, or which may be supported by springs, as illustrated in Fig. 1. It will be understood that in this modification of the invention, the side walls 10a will be mounted for reciprocation in suitable manner and provided with mechanism, such as shown in Fig. 1, for reciprocating them as a unit. The air hammer, top plate and anvil, shown in Fig. 1, also will be employed in this form of the apparatus.

In carrying out the method of my invention in the molding of refractory blocks, a mixture may be used consisting of grog in properly graded sizes mixed with a small amount of clay or clay slip in the desired quantity and of the proper viscosity, although my invention is not limited to the use of such a mixture. The mixture or other material is placed in the mold, the air hammer being swung to one side for this purpose, whereupon the top plate 23 and the anvil 26 are introduced into the mold on top of the material. The material is thereupon shaken or vibrated and also compacted by the rapid vertical movement of the table 14 and the weight of anvil 26 and by the impacts of the air hammer on the anvil 26, such impacts being magnified or caused to reverberate by the resilient insert 28 on the anvil 26 and by the springs 29.

It will be understood that the shaking or vibration of the table tends to move about the particles of the mixture being compacted to cause them to assume the most compact and intimate relation, whereas the operation of the air hammer is primarily to compress the material in a vertical direction.

If the method is performed by employing the modification of Fig. 3, the shaking of the mold is dispensed with, as also may be the springs for supporting the bottom plate of the mold, although such springs may be retained if desired.

Also, in lieu of or in conjunction with hammer 24, rapid vibrating blows may be applied to the bottom plate 22 by suitable means (not shown).

At the beginning of the shaking or vibration and compacting of the material, the mold will be filled and the side walls and top plate of the mold will occupy the positions substantially shown in Fig. 4. As the table is shaken and the air hammer also is operated to compact the material, aided by the weight of the anvil 26 and the reverberation between the top and bottom of the mold, the air hammer is fed downwardly by rotation of hand wheel 42 in the proper direction, and at the same time, the side walls may be driven downwardly by the motor 48.

Preferably, the action and descent of the air hammer is so regulated and its descent so controlled that 80% or more of the compacting of the material is accomplished in 20% or less of the entire molding period, and the remaining 20% or less of the compacting effected in at least 80% of the entire molding period.

The term "molding period" as used herein means the period of time between the beginning and ending of the effective compacting operation of hammer 24 or, in other words, the period in which the material is forced downwardly in the mold by the hammer to form the block. It will be understood, however, that the rate of compacting may be varied from that described with good results.

The devotion of a major part of the compacting period to the last stage of compacting is important because at this time the material is rapidly approaching its maximum density, which means that the release of air therefrom becomes increasingly difficult. To facilitate such release of air at this critical time, it is preferred to utilize at least 80% of the molding period.

Thus, as shown in Fig. 5, the anvil 26 and the hammer 24 have been lowered to a point where approximately 20% of compression is yet to be accomplished.

In the meantime, the side walls of the mold have been driven downwardly as a unit, this serving to loosen the material at the side walls, which tends to adhere thereto, in a manner to permit air to escape from the interior of the material. To insure that there will be adequate relative movement between the side walls of the mold and the material being compacted for the foregoing purpose, it is preferred that the side walls be moved a greater distance than the distance through which the material is compacted. For example, if the material is compacted say eight inches, then it is preferred to drive the mold walls downwardly a distance of say nine or ten inches. This positively assures relative movement between all portions of the material and the mold walls at the time during the compressing operation.

To accomplish such movement, it is of course necessary to make the side walls of the proper length and to locate the pinion gears 46 at the proper distance from the lowermost position of the bottom plate 22. In the drawings which are made to scale, the material may be compacted eight inches to form a block twelve inches thick, and the mold walls can be moved downwardly a distance of ten inches.

Assuming that the preferred rate of compacting described above is employed, the final stage of compacting, that is, the descent of the anvil 26 from the position shown in Fig. 5, to the position shown in Fig. 6, will require approximately 80% of the entire molding period. Finally, that is, at the end of the molding period, the side walls of the mold will be driven to their lowest position, as shown in Fig. 6.

The molding being completed, the block is stripped by elevation of the side walls as a unit to the position shown in Fig. 7, the air hammer being held in its lower position to hold the anvil 26 and plate 23 against the finished block to overcome the friction between the block and the side walls of the mold. The anvil 26 thereupon may be removed. This will leave the finished block resting on the bottom of the mold, as shown in Fig. 7, which may now be removed in any convenient manner, the block preferably being carried from the apparatus by means of the bottom plate to prevent injury thereto.

By stripping the mold from the block, as explained above, blocks may be produced at a higher speed than if the mold were to be dismantled and the side walls separately removed from the finished blocks.

It is to be understood that variations may be made in the construction of the apparatus and in the performance of the method and in the mode of applying and utilizing the various structural features and method steps herein disclosed without departing from the invention. Features of the invention, as defined in the claims, both of apparatus and of method, may be used to advantage in types of block molding apparatus and methods other than those illustrated and described herein within the scope of the claims directed to such features.

Having thus described my invention what I desire to claim and secure by Letters Patent is:

1. The method of molding refractory blocks and the like which comprises placing the material for a block in a mold, subjecting the material in the mold to vibration, and positively moving the side walls of said mold relative to the material therein and to both the top and bottom of the mold during such vibration.

2. The method of molding refractory blocks and the like which comprises placing the material for a block in the mold, shaking the mold and material therein, and simultaneously effecting relative movement between the side walls of the mold and the material in and both ends of the mold.

3. The method of molding refractory blocks and the like which comprises placing the material for a block in the mold, shaking the mold and the material therein, applying rapid vibrating blows to the material to compact the material in the mold, and effecting relative movement between the side walls of the mold and said material during compacting thereof.

4. The method of molding refractory blocks and the like which comprises placing the material for a block in the mold, shaking the mold and the material therein, applying rapid vibrating blows to the material to compact the material in the mold, and positively moving the side walls of the mold relative to the material in the mold.

5. The method of molding refractory blocks and the like which comprises placing the material for a block in a mold, subjecting the material in the mold to vibration, and positively moving the side walls of the mold downwardly relative to both the top and bottom of the mold during such vibration.

6. The method of molding refractory blocks and the like which comprises placing the material for a block in a mold, imparting rapid vibrating blows to the material in a downward direction to compact the material in the mold, and positively moving the side walls of the mold downwardly relative to the material and to the top and bottom of the mold while so compacting the material.

7. The method of molding refractory blocks and the like which comprises placing the material for a block in the mold, shaking the mold and material therein while compacting the material downwardly in the mold by rapid vibrating blows applied from above, and positively moving the side walls of the mold downwardly relative to the material while the material is being so compacted.

8. The method of molding refractory blocks and the like which comprises introducing the material for a block into a mold, forcing the material downwardly in the mold to form a compact mass while the side walls of the mold are moved downwardly relative to both the top and the bottom of the mold a greater distance than that through which any of the material is forced downwardly.

9. The method of molding refractory blocks and the like which comprises introducing the material for a block into a mold, subjecting the material to rapid vibrating blows to compact the material in the mold while the side walls of the mold are moved relative to both the top and bottom of the mold through a greater distance than the material is compacted.

10. The method of forming refractory blocks and the like which comprises introducing the material for a block into a mold, shaking the mold and material therein while applying rapid vibrating blows to the material to compact it in the mold, and while the side walls of the material are moved through a greater distance than that through which the material is compacted.

11. The method of molding refractory blocks and the like which comprises placing the material for a block in a mold, and compacting the material in the mold approximately 80 per cent. during approximately 20 per cent. of the molding period, and approximately 20 per cent. during approximately 80 per cent. of the molding period.

12. The method of molding refractory blocks and the like which comprises placing the material for a block in a mold, and compacting the material at least 80 per cent. in 20 per cent. or less of the molding period, and the remaining 20 per cent. or less in at least 80 per cent. of the molding period.

13. The method of molding refractory blocks and the like which comprises placing material for a block in a mold, compacting the material in the mold at least 80 per cent. during 20 per cent. or less of the molding period, and the remaining 20 per cent. of compacting in 80 per cent. or more of the molding period, and effecting relative movement between the side walls of the mold and the entire mass of material during compacting of the material.

14. Apparatus for molding refractory blocks and the like comprising a mold, said mold including rigidly connected side walls, a separate top and a separate bottom, means acting to compact material between the top and bottom of the mold to form a block, and means for effecting relative movement between the side walls of the mold and the top and bottom of the mold through a distance greater than that through which the material is compacted.

15. Apparatus for molding refractory blocks and the like comprising a mold including rigidly connected side walls, a separate top plate and a separate bottom plate, power means adapted to act on one of said plates to compact material in said mold to form a block, and means for moving said side walls as a unit through a greater distance than said last-named plate during operation of said power means.

16. Apparatus for molding refractory blocks and the like comprising a mold including rigidly connected side walls, a separate bottom plate and a separate top plate, means for applying rapid vibrating blows to said top plate to move it downwardly and thus compact material in the mold to form a block, and power means for moving the side walls of the mold downwardly a greater distance than said top plate is moved in forming said block.

17. Apparatus for molding refractory blocks and the like which comprises a shaking carrier, a mold supported thereby including rigidly connected side walls and a separate bottom plate, and means for reciprocating said side walls as a unit relative to said carrier and to said mold bottom plate.

18. Apparatus for molding refractory blocks and the like comprising a shaking carrier, a mold supported thereby including rigidly connected side walls and separate top and bottom plates, and means for positively moving said side walls downwardly as a unit relative to said carrier and said top and bottom plates during shaking thereof.

19. Apparatus for molding refractory blocks and the like comprising a shaking carrier, a mold supported by said carrier including rigidly connected side walls and separate top and bottom plates fitting within said side walls, and means acting to move one of said plates toward the other to compress material in the mold to form a block, means for moving said side walls a greater distance than said last-named plate is moved during moving of said plate and while said carrier is being shaken.

20. Apparatus for molding refractory blocks and the like comprising a mold including rigidly connected side walls and top and bottom plates fitting within said side walls, means for applying rapid vibrating blows to one of said plates to compact material in said mold, and resilient means for effecting reverberation of said blows upon material in said mold.

21. Apparatus for molding refractory blocks and the like which comprises a mold including rigidly connected side walls and separate top and bottom plates, an anvil adapted to rest in said top plate, means for applying rapid vibrating blows to said anvil, and a resilient member fixed to said anvil in position to receive the blows from the last-named means.

22. Apparatus for molding refractory blocks and the like which comprises a shaking carrier, a mold supported by said carrier, said mold including rigidly connected side walls and separate top and bottom plates, an air hammer adapted to apply rapid vibrating blows to said top plate to compact material between said plates and form a block, and means for moving said side walls downwardly as a unit during such compacting and to thereafter strip the side walls upwardly from the block.

23. Apparatus for molding refractory blocks and the like which comprises a mold including rigidly connected side walls, top and bottom members for the mold adapted to fit snugly and slidably within said walls, the clearance between said plates and the mold walls being sufficient to permit escape of air but insufficient for the entrance of material being molded between said plates and side walls, and means for applying rapid vibrating blows to one of said plates to compact material in the mold.

24. Apparatus for molding refractory blocks and the like which comprises a mold including connected side walls, top and bottom members for the mold adapted to fit snugly and slidably within said walls, the clearance betwen said plates and said walls being of the order of five-thousandths of an inch, and means for applying rapid vibrating blows to one of said plates to compact material in the mold.

PAUL G. WILLETTS.